United States Patent
Mandelli et al.

(10) Patent No.: US 11,729,664 B2
(45) Date of Patent: Aug. 15, 2023

(54) ALLOCATING RESOURCES FOR COMMUNICATION AND SENSING SERVICES

(71) Applicant: NOKIA SOLUTIONS AND NETWORKS OY, Espoo (FI)

(72) Inventors: Silvio Mandelli, Ludwigsburg (DE); Mark Doll, Stuttgart (DE); Maximilian Arnold, Murrhardt (DE); Thorsten Wild, Stuttgart (DE)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 18/098,558

(22) Filed: Jan. 18, 2023

(65) Prior Publication Data

US 2023/0232273 A1 Jul. 20, 2023

(30) Foreign Application Priority Data

Jan. 19, 2022 (FI) ...................................... 20225042

(51) Int. Cl.
*H04W 28/02* (2009.01)
*H04W 28/08* (2023.01)

(52) U.S. Cl.
CPC ... *H04W 28/0268* (2013.01); *H04W 28/0925* (2020.05); *H04W 28/0967* (2020.05)

(58) Field of Classification Search
CPC ......... H04W 28/0268; H04W 28/0925; H04W 28/0967
See application file for complete search history.

(56) References Cited

U.S. PATENT DOCUMENTS

| 6,438,135 B1 | 8/2002 | Tzeng | |
| 2016/0014812 A1* | 1/2016 | Park | H04L 5/0048 370/329 |

(Continued)

FOREIGN PATENT DOCUMENTS

| CN | 107733689 A | 2/2018 |
| WO | 2020/212640 A1 | 10/2020 |
| WO | 2022/000227 A1 | 1/2022 |

OTHER PUBLICATIONS

Office Action dated Aug. 11, 2022 corresponding to Finnish Application No. 20225042.

(Continued)

*Primary Examiner* — Kashif Siddiqui
(74) *Attorney, Agent, or Firm* — Squire Patton Boggs (US) LLP (57) ABSTRACT

An apparatus comprising at least one processor and at least one memory including computer program code, the at least one memory and the computer program code being configured to, with the at least one processor, cause the apparatus at least to perform determining, per a communication service to which resources are to be allocated, a metric value using a first predefined set of rules, determining, per a sensing service to which resources are to be allocated, a metric value using a second predefined set of rules, sorting communication services to which resources are to be allocated and sensing services to which resources are to be allocated based on the metric values to a sorted order using a third rule, and allocating resources for the communication services and the sensing services based on the sorted order.

10 Claims, 4 Drawing Sheets

(56) References Cited

U.S. PATENT DOCUMENTS

2020/0295883 A1* 9/2020 Lee ................. H04L 5/0057
2020/0314804 A1* 10/2020 Shin ................. H04W 24/10
2020/0403731 A1* 12/2020 Zhang ............... H04W 76/14

OTHER PUBLICATIONS

Finnish Search Report dated Aug. 11, 2022 corresponding to Finnish Patent Application No. 20225042.
Q. Zhang et al., "Design and Performance Evaluation of Joint Sensing and Communication Integrated System for 5G mmWave Enabled CAVs," In: IEEE Journal of Selected Topics in Signal Processing, Sep. 2, 2021, vol. 15, No. 6.
X. Zhang et al., "Joint Sensing, Communication, and Computation Resource Allocation for Cooperative Perception in Fog-Based Vehicule Networks," 2021 13th International Conference on Wireless Communications and Signal Processing (WCSP), IEEE, Dec. 1, 2021.
Huawei et al., "New SID on 5G Architecture enhancements for Harmonized Communication and Sensing Service," S2-2108769, 3GPP SA WG2 Meeting #S2-148E, Nov. 15-19, 2021, Electronic Meeting, Nov. 8, 2021.
Communication of Acceptance—section 29 a of Patents Decree dated Dec. 8, 2022 corresponding to Finnish Patent Application No. 20225042.
Thorsten Wild et al., "Joint Design of Communication and Sensing for Beyond 5G and 6G Systems," IEEE Access, IEEE, vol. 19, Feb. 15, 2021, pp. 30845-30857, XP011840202.
Thorsten Wild et al., "Joint Design of Communication and Sensing for Beyond 5G and 6G Systems," IEEE Access, EEE, vol. 19, Feb. 15, 2021, p. 30845-30857, XP011840202.

* cited by examiner

ALLOCATING RESOURCES FOR COMMUNICATION AND SENSING SERVICES

CROSS REFERENCE TO RELATED APPLICATION

This application claims the benefit of Finnish Patent Application No. 20225042, filed Jan. 19, 2022. The entire content of the above-referenced application is hereby incorporated by reference.

TECHNICAL FIELD

Various example embodiments described herein relate to the field of wireless communications.

BACKGROUND

Wireless networks provide communication services that enable devices to connect to each other and receive and transmit data. The physical resources used for communication may also be utilized for sensing such as sensing the state and behaviour of various active devices and/or objects in the environment.

SUMMARY

According to an aspect there is provided an apparatus comprising at least one processor and at least one memory including computer program code, the at least one memory and the computer program code being configured to, with the at least one processor, cause the apparatus at least to perform: determining, per a communication service to which resources are to be allocated, a metric value using a first predefined set of rules, determining, per a sensing service to which resources are to be allocated, a metric value using a second predefined set of rules, sorting communication services to which resources are to be allocated and sensing services to which resources are to be allocated based on the metric values to a sorted order using a third rule, and allocating resources for the communication services and the sensing services based on the sorted order.

In an embodiment, the at least one memory and the computer program code are configured to, with the at least one processor, cause the apparatus further to perform: determining, per a sensing service, a weight value, calculating, per a sensing service, an instantaneous relevance value, calculating, per a sensing service, an average allocated resources value, and calculating a normalization value to the sensing services, wherein the second predefined set of rules comprises: calculating the metric value by multiplying the instantaneous relevance value calculated for the sensing service by the normalization value calculated and by the weight value determined for the sensing service, and dividing the result by the average allocated resources value calculated for the sensing service.

In an embodiment, the at least one memory and the computer program code are configured to, with the at least one processor, cause the apparatus further to perform calculating the instantaneous relevance value by: increasing the instantaneous relevance value for the sensing service when a time elapsed from a preceding time the sensing service was allocated resources increases.

In embodiments, the at least one memory and the computer program code are configured to, with the at least one processor, cause the apparatus further to perform calculating the average allocated resources value, per a sensing service, by: calculating an instantaneous allocated resources value, and calculating the average allocated resources value as a linear combination of the previous average allocated resources value calculated for the service and the instantaneous allocated resources value calculated.

In embodiments, the at least one memory and the computer program code are configured to, with the at least one processor, cause the apparatus further to perform: determining, per a communication service, a weight value, calculating, per a communication service, an achievable instantaneous rate, and calculating, per a communication service, an average previously experienced rate, wherein the first predefined set of rules comprises: calculating the metric value by multiplying the achievable instantaneous rate calculated for the communication service by the weight value determined for the communication service and dividing the result by the average previously experienced rate calculated for the communication service, and calculating, per a communication service that was allocated resources at a preceding time resources were allocated, the average allocated resources value, and calculating an instantaneous proportional fair opportunistic gain by multiplying, per a communication service that was allocated resources at the preceding time resources were allocated, the metric value calculated for the communication service by the average allocated resources value calculated for the communication service, dividing, per a communication service, the result by the weight value determined for the communication service, adding the results per communication services together for resources allocated to the communication services that were allocated resources at the preceding time resources were allocated, and dividing the sum by the number of the said resources allocated.

In embodiments, the at least one memory and the computer program code are configured to, with the at least one processor, cause the apparatus further to perform calculating the normalization value by: calculating the instantaneous proportional fair opportunistic gain of communication services that were allocated resources at the preceding time resources were allocated, calculating an average proportional fair opportunistic gain as a linear combination of the calculated instantaneous proportional fair opportunistic gain and the average proportional fair opportunistic gain at the preceding time resources were allocated, and determining the normalization value as the calculated average proportional fair opportunistic gain.

In an embodiment, the at least one memory and the computer program code are configured to, with the at least one processor, cause the apparatus further to perform: determining, per a communication service, a weight value, and determining, per a sensing service, a weight value, wherein the first predefined set of rules and the second predefined set of rules comprise determining the metric value as equal to the weight value.

In an embodiment, allocating resources for the communication services and the sensing services based on the sorted order comprises: dividing the resources to resource portions, wherein sizes of the resource portions are proportional to the metric values determined, and allocating the resource portions to the services such that the size of a resource portion corresponds to the metric value of a service.

In embodiments, the at least one memory and the computer program code are configured to, with the at least one processor, cause the apparatus further to perform: determining, prior to determining the metric values and sorting based on the metric values, for the services, per a service, a priority value, sorting, prior to determining the metric values and sorting based on the metric values, the services to a priority order based on the priority values, if the services are discriminated by the priority order to perform allocating resources, allocating resources to the services using the priority order, otherwise, performing determining the metric values and sorting the services based on the metric values and allocating resources to the services using the sorted order based on the metric values.

In embodiments, the at least one memory and the computer program code are configured to, with the at least one processor, cause the apparatus further to perform, when resources to be allocated are provided on a plurality of beams: associating, per a communication service, a beam to be used by the communication service, associating, per a sensing service, a beam to be used by the sensing service, selecting at least one beam associated to a communication service or a sensing service based on the metric values using the third rule, setting communication services and sensing services that can be served by the at least one beam selected as a candidate set, sorting the communication services and the sensing services in the candidate set to a sorted order either based on the metric values, or determining, per a service in the candidate set, a weight value and sorting based on weight values, and allocating resources to the services in the candidate set based on the sorted order.

In embodiments, the at least one memory and the computer program code are configured to, with the at least one processor, cause the apparatus further to perform: assessing an amount of resources needed by the services, if the assessed amount of resources needed exceeds an amount of available resources, performing determining the metric values, sorting the services based on the metric values, and allocating resources to the services using the sorted order, otherwise, allocating resources to the services.

According to an aspect there is provided a method comprising: determining, per a communication service to which resources are to be allocated, a metric value using a first predefined set of rules, determining, per a sensing service to which resources are to be allocated, a metric value using a second predefined set of rules, sorting communication services to which resources are to be allocated and sensing services to which resources are to be allocated based on the metric values to a sorted order using a third rule, and allocating resources for the communication services and the sensing services based on the sorted order.

According to an aspect there is provided a computer-readable medium comprising program instructions for causing an apparatus to perform at least the following: determining, per a communication service to which resources are to be allocated, a metric value using a first predefined set of rules, determining, per a sensing service to which resources are to be allocated, a metric value using a second predefined set of rules, sorting communication services to which resources are to be allocated and sensing services to which resources are to be allocated based on the metric values to a sorted order using a third rule, and allocating resources for the communication services and the sensing services based on the sorted order.

In an embodiment, the computer-readable medium is a non-transitory computer-readable medium.

According to an aspect there is provided a computer program comprising instructions for causing an apparatus to perform at least the following: determining, per a communication service to which resources are to be allocated, a metric value using a first predefined set of rules, determining, per a sensing service to which resources are to be allocated, a metric value using a second predefined set of rules, sorting communication services to which resources are to be allocated and sensing services to which resources are to be allocated based on the metric values to a sorted order using a third rule, and allocating resources for the communication services and the sensing services based on the sorted order.

BRIEF DESCRIPTION OF THE DRAWINGS

In the following various exemplary embodiments will be described in greater detail with reference to the accompanying drawings, in which.

DETAILED DESCRIPTION

The following embodiments are examples. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned. Further, although terms including ordinal numbers, such as "first", "second", etc., may be used for describing various elements, the structural elements are not restricted by the terms. The terms are used merely for the purpose of distinguishing an element from other elements. For example, a first rule could be termed a second rule, and similarly, a second rule could be also termed a first rule without departing from the scope of the present disclosure.

In the following, different exemplifying embodiments will be described using, as an example of an access architecture to which the embodiments may be applied, a radio access architecture based on long term evolution advanced (LTE Advanced, LTE-A) or new radio (NR, 5G), without restricting the embodiments to such an architecture, however. The embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WiAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
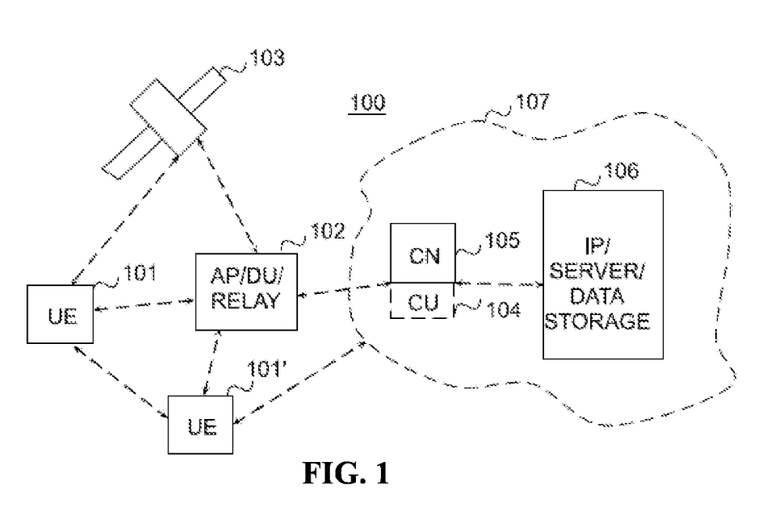
FIG. 1 illustrates an exemplified wireless communication system.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system 100 given as an example but a person skilled in the art may apply the solution to other communication systems provided with necessary properties.

The example of FIG. 1 shows a part of an exemplifying radio access network.

FIG. 1 shows user devices 101, 101' configured to be in a wireless connection on one or more communication channels with a node 102. The node 102 is further connected to a core network 105. In one example, the node 102 may be an access node such as (e/g)NodeB providing or serving devices in a cell. In one example, the node 102 may be a non-3GPP access node. The physical link from a device to a (e/g)NodeB is called uplink or reverse link and the physical link from the (e/g)NodeB to the device is called downlink or forward link. It should be appreciated that (e/g)NodeBs or their functionalities may be implemented by using any node, host, server or access point etc. entity suitable for such a usage.

A communications system typically comprises more than one (e/g)NodeB in which case the (e/g)NodeBs may also be configured to communicate with one another over links, wired or wireless, designed for the purpose. These links may be used for signalling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to devices. The antenna unit may comprise a plurality of antennas or antenna elements. The (e/g)NodeB is further connected to the core network 105 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), or access and mobility management function (AMF), etc.

The user device (also called UE, user equipment, user terminal, terminal device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station.

The user device typically refers to a device (e.g. a portable or non-portable computing device) that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a device may also be a nearly exclusive uplink only device, of which an example is a camera or video camera loading images or video clips to a network. A device may also be a device having capability to operate in Internet of Things (IoT) network which is a scenario in which objects are provided with the ability to transfer data over a network without requiring human-to-human or human-to-computer interaction, e.g., to be used in smart power grids and connected vehicles. The user device may also utilise cloud. In some applications, a user device may comprise a user portable device with radio parts (such as a watch, earphones, eyeglasses, other wearable accessories or wearables) and the computation is carried out in the cloud. The device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input—multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also being integrable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz—cmWave, below 6 GHz—cmWave—mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 106, or utilise services provided by them. The communication network may also be able to support the usage of cloud services, for example at least part of core network operations may be carried out as a cloud service (this is depicted in FIG. 1 by "cloud" 107). The communication system may also comprise a central control entity, or a like, providing facilities for networks of different operators to cooperate for example in spectrum sharing.

The technology of Edge cloud may be brought into a radio access network (RAN) by utilizing network function virtualization (NVF) and software defined networking (SDN). Using the technology of edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloud RAN architecture enables RAN real time functions being carried out at the RAN side (in a distributed unit, DU 102) and non-real time functions being carried out in a centralized manner (in a centralized unit, CU 104).

It should also be understood that the distribution of labour between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilise geostationary earth orbit (GEO) satellite systems, but also low earth orbit (LEO) satellite systems, in particular mega-constellations (systems in which hundreds of (nano)satellites are deployed). Each satellite 103 in the mega-constellation may cover several satellite-enabled network entities that create on-ground cells. The on-ground cells may be created through an on-ground relay node 102 or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may comprise also other apparatuses, such as physical layer relay nodes or other network elements, etc. At least one of the (e/g)NodeBs or may be a Home(e/g)NodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometres, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)NodeBs, includes, in addition to Home (e/g)NodeBs (H(e/g)NodeBs), a home node B gateway, or HNB-GW (not shown in FIG. 1). A HNB Gateway (HNB-GW), which is typically installed within an operator's network may aggregate traffic from a large number of HNBs back to a core network.

In 5G and beyond, it is envisaged that communication networks are converted to joint physical-biological networks, where a controller is capable of sensing the state and behaviour of both active and passive nodes, devices, and objects within its environment. Sensing services may use the same physical resources as communication services. Sensing services may be understood as services performing sensing the state and behaviour of various active devices and/or objects in an environment, for example, availability of a channel prior to transmission of data. Communication services may be understood as services performing the transmission of data. Delivering sensing capabilities will benefit future generations of wireless networks. To enable allocating resources in a scalable and adaptive way, especially when there are not enough resources to be allocated to all services wanting resources, some selection criteria may be implemented.

An apparatus configured to allocate resources may be configured to allocate resources from a common shared resource pool to communication services and sensing services. The apparatus may be configured to use metric values to allow flexible scheduling, that is, allocating resources amongst communication services and sensing services, for example as described below with FIG. 2 to 6.

Figure 2:
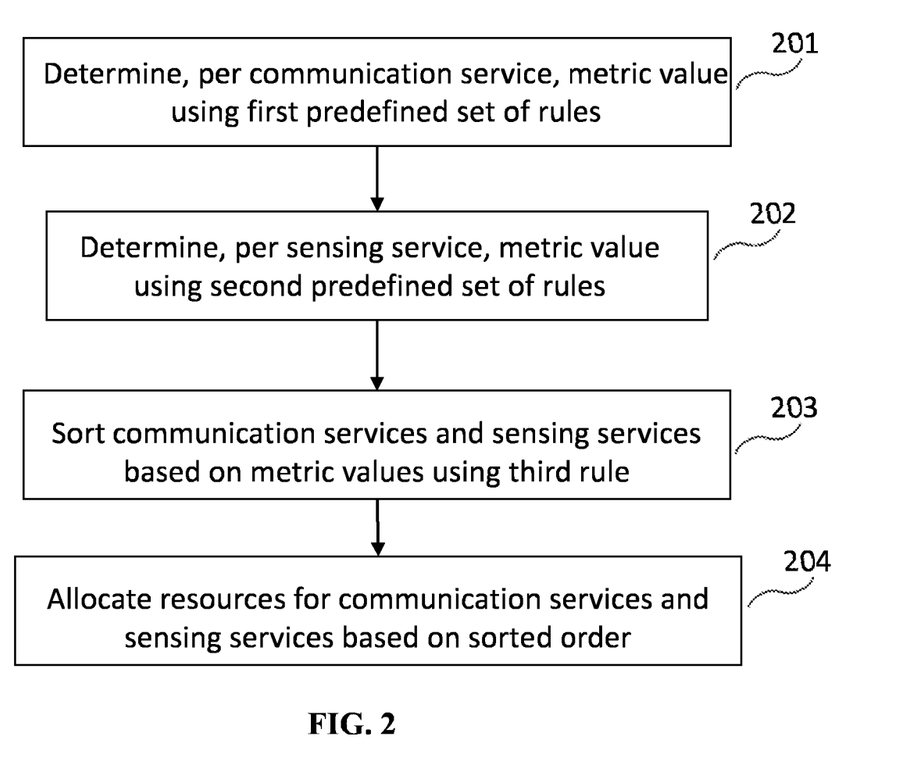
FIG. 2 to 6 illustrate example functionalities.

FIG. 2 illustrates an example functionality of an apparatus configured to flexible allocation of resources from a common shared resource pool using soft prioritization based on metric values.

Referring to FIG. 2, a metric value is determined in block 201, per a communication service to which resources are to be allocated, using a first predefined set of rules.

For example, the metric value may be determined including calculating by multiplying a calculated achievable instantaneous rate by a determined weight value and dividing the result by a calculated average previously experienced rate. In other words, the weight value, the achievable instantaneous rate, and the average previously experienced rate are determined per a communication service. The weight value W may be a predetermined or a preconfigured value, or it may be calculated. For example, the weight value may depend on the residual tolerable delay and desired delay budgets of the communication service. The weight value may be an input from higher layers depending, for example, on the Quality of Service (QoS) profile of the service such as 5G QoS Indicator (5QI) in 5G standards. The achievable instantaneous rate $A_i(\tau)$ at time $\tau$ represents the instantaneous rate that is achievable if the service i is scheduled for transmission. In another embodiment, the achievable instantaneous rate may depend also on the resource j that is considered, and thus may be denoted as $A_{i,j}(\tau)$. The average previously experienced rate $r_i(\tau)$ at time $\tau$ may be updated as a linear combination $r_i(\tau)=\alpha_i r_i(\tau-1)+(1-\alpha_i)r_i'(\tau-1)$, where $\alpha_i \in (0,1)$ is a configurable parameter associated with a communication service i, and where $r_i'(\tau)$ is an instantaneous experienced rate of service i at time $\tau$. The instantaneous experienced rate of service may be defined as $r_i'(\tau)=A_i(\tau) R_i'(\tau)$ after scheduling. $R_i'(\tau)$ is the instantaneous allocated resources value of the communication service i at time $\tau$. In another embodiment, the instantaneous experienced rate may depend also on the resource j that is considered, and thus may be denoted as $r_{i,j}'(\tau)$. The metric value per a communication service may then be determined using proportional fair (PR) principles. The calculating of the metric value may be expressed as $$M_i(\tau) = W_i \frac{A_i(\tau)}{r_i(\tau)} = W_i P_i(\tau),$$

where $W_i$, $A_i(\tau)$, and $r_i(\tau)$ are as defined above and $P_i(\tau)$ may be understood as a current de-weighted proportional fair metric value at time $\tau$. Proportional fair scheduling provides weighted fairness and opportunistic gains for communication services, which may be understood as scheduling the communication services when their instantaneous achievable rate is higher compared to the average previously experienced rate.

In another implementation, the metric value for communication services may be determined using weighted round robin (WRR) principles. Weighted round robin is a generalisation of round robin scheduling. In round robin scheduling resources are allocated to communication services in turn, and in weighted round robin scheduling resources are allocated to communication services in proportion to weights. The resource allocation may be implemented, for example, by dividing the available resources into packets and allocating to a service a number of resource packets equal to the weight of the service. This implementation approaches weighted fair queueing (WFQ) principles in the long run, since weighted fair queueing principles assume that available resources could be split infinitely to packets. For example, the metric value may be determined to be a weight value. In other words, a weight value is determined per a communication service. The weight value $W_i$ may be a predetermined or a preconfigured value, or it may be calculated. The metric value per a communication service may then be determined as equal to the determined weight value $M_i(\tau)=W_i$.

A metric value is determined in block 202, per a sensing service to which resources are to be allocated, using a second predefined set of rules. The metric value determined using the second predefined set of rules may be a sensing metric value, which is a metric value that is comparable with metric values based on proportional fair principles for communication services.

The sensing metric values for the sensing services may be calculated by, for example, multiplying a calculated instantaneous relevance value by a calculated normalization value and by a determined weight value and dividing the result by a calculated average allocated resources value. In other words, the weight value, the instantaneous relevance value, the normalization value, and the average allocated resources value are determined per a sensing service. The weight value W may be a predetermined or a preconfigured value, or it may be calculated. For example, the weight value may depend on the residual tolerable delay and desired delay budgets of the sensing service. The weight value may be an input from higher gNB layers depending, for example, on the Quality of Service (QoS) profile of the sensing service such as 5G QoS Indicator (5QI) in 5G standards. Alternatively, the weight value may be assigned by location management function (LMF) or session management function (SMF).

The instantaneous relevance value is calculated per a sensing service. The instantaneous relevance value $N_i(\tau)$ at time $\tau$ represents how useful a sensing scan with the sensing service, that is, allocating resources to the sensing service, may be at the time resources are to be allocated. The instantaneous relevance value may not be necessary for a specific sensing service i and may then be set $N_i(\tau)=1$. The instantaneous relevance value may increase when a time elapsed from a preceding time the sensing service was allocated resources increases, and it may decrease when a new scan is made, that is, the sensing service is allocated resources. Moreover, the instantaneous relevance value may determine that the sensing service is not considered as a candidate for resource allocation if a predefined number of sensing scans have been performed. The instantaneous relevance value may be calculated, for example, as follows. An upper token bound value and a slot value are determined per a sensing service. The upper token bound value $U_i$ represents how much boosting value can be accumulated to the sensing service i. A default set value for the upper token bound value could be $U_i=1$, but also higher values may be considered to boost sensing services. The slot value $T_i$ represents a number of slots/subframes corresponding to a desired sensing scan period. The slot value may be utilized to avoid unnecessary acquisitions or frequent scans, which may mean resource consumption and/or emitted interference and power. If the sensing service is not active, the instantaneous relevance term $N_i(\tau)$ may be set to zero. If the sensing service is active, it is then resolved whether the sensing service was scheduled, that is, allocated resources, at the preceding time that resources were allocated. If the sensing service was scheduled at time $\tau-1$, an auxiliary term $D_i(\tau-1)$ may be set to one for the sensing service. If the sensing service was not scheduled at time $\tau-1$, the auxiliary term $D_i(\tau-1)$ may be set to zero. Then an auxiliary relevance term $N_i^*(\tau)$ may be calculated as the smallest of the values of the upper token bound term $U_i$ and of the expression $$N_i^*(\tau-1) + \frac{1}{T_i} - D_i(\tau-1).$$

If the value of the auxiliary relevance term $N_i^*(\tau)$ is negative, the relevance term $N_i(\tau)$ may be set to zero. If the value of the auxiliary relevance term $N_i^*(\tau)$ is not negative, the relevance term $N_i(\tau)$ may be set to be the value of the auxiliary relevance term, that is, $N_i(\tau)=N_i^*(\tau)$. The calculation of the relevance term $N_i(\tau)$ may be expressed as $$N_i(\tau) = \begin{cases} 0 & \text{if } N_i^*(\tau) < 0 \lor i \text{ is not active,} \\ N_i^*(\tau) & \text{otherwise,} \end{cases}$$

$$\text{where } N_i^*(\tau) = \min\left(U_i, N_i^*(\tau-1) + \frac{1}{T_i} - D_i(\tau-1)\right),$$

-continued $$\text{and } D_i(\tau) = \begin{cases} 1 & \text{if } i \text{ is scheduled at time } \tau, \\ 0 & \text{otherwise.} \end{cases}$$

Note that the relevance term $N_i(\tau)$ increases if the sensing service is not allocated resources, that is, not scheduled, and decreases if the sensing service is scheduled.

The average allocated resources value may be calculated, for example, by calculating an instantaneous allocated resources value, and then calculating the average allocation resources value as a linear combination of the previous average allocated resources value calculated for the sensing service and the instantaneous allocated resources value calculated. The initialization value for the average allocated resources value may be set to an arbitrary value, for example, zero. Alternatively, the initialization value may be set to an average of the average allocated resources values of sensing services that are already active. The calculating of the average allocated resources value $R_i(\tau)$ at time $\tau$ may be expressed as $R_i(\tau)=\alpha_i R_i(\tau-1)+(1-\alpha_i)R_i'(\tau-1)$, where time $\tau-1$ expresses a preceding time resources were allocated to any service, $R_i'(\tau)$ is the instantaneous allocated resources value of the sensing service i at time $\tau$, and $\alpha_i \in (0,1)$ is a configurable parameter associated with the sensing service i.

The normalization value $G_c(\tau)$ at time $\tau$ merges, that is, normalizes, the metric values for the sensing services to the same range as the metric values for the communication services that are competing for the same resources. This enables allocating resources in a manner that is proportional to the weight values $W_i$ determined, separately, for the sensing services and the communication services. The normalization value may be calculated by, for example, as follows based on the concept of proportional fair opportunistic gain.

An instantaneous proportional fair opportunistic gain for communication services that were allocated resources at the preceding time resources were allocated may be calculated, for example, as follows. The average allocated resources value is calculated per a communication service that was allocated resources at the preceding time resources were allocated. Then the instantaneous proportional fair opportunistic gain is calculated by multiplying, per a communication service, the metric value calculated for the communication service by the average allocated resources value calculated for the communication service, dividing the result by the weight value determined for the communication service, and adding the results per communication services together for the communication services that were allocated resources at the preceding time resources were allocated. The instantaneous proportional fair opportunistic gain at time $\tau$ may be expressed as $$G_c'(\tau) = \frac{1}{|C(\tau)|} \sum_{j \in C(\tau)} \frac{M_{i(j)}(\tau)}{W_{i(j)}} R_{i(j)}(\tau),$$

where $W_i$, $M_i(\tau)$, and $R_i(\tau)$ are as defined above, i(j) is a service i that has a resource j allocated to it, $C(\tau)$ is a set of resources allocated to communication services at time $\tau$, that is, the resources that would be scheduled to communication services at time $\tau$, and $|C(\tau)|$ is the number of resources in the set $C(\tau)$. An average proportional fair opportunistic gain is calculated as a linear combination of the calculated instantaneous proportional fair opportunistic gain at the preceding time that resources were allocated and the average proportional fair opportunistic gain at the preceding time that resources were allocated. The average proportional fair opportunistic gain may be expressed as $G_c(\tau)=\alpha G_c(\tau-1)+(1-\alpha)G_c'(\tau-1)$, with $\alpha \in (0,1)$ a configurable parameter. The initialization value of the average proportional fair opportunistic gain may be set to an arbitrary value, for example, one. Alternatively, the initialization value may be set to an average of the average proportional fair opportunistic gain values of communication services that are already active. The normalization value is determined as the average proportional fair opportunistic gain calculated. The normalization value $G_c(\tau)$ functions as enhancing the sensing metric values. Typically, a winning proportional fair metric value of a communication service i is higher than $W_i/R_i$, since the winning proportional fair metric values may have a higher channel realization than the average channel experienced by communication services. The normalization value $G_c(\tau)$, which may be understood as a correction term, enables that the sensing metric values can co-exist with the metric values for communication services based on proportional fair principles.

The metric value for the sensing service is then calculated according to the second predefined set of rules. The calculating of the metric value may be expressed as $$M_i(\tau) = \frac{W_i N_i(\tau) G_c(\tau)}{R_i(\tau)},$$

where $W_i$, $N_i(\tau)$, $G_c(\tau)$, and $R_i(\tau)$ are as defined above.

In another implementation, the metric value for sensing services may be determined using weighted round robin (WRR) principles. For example, the metric value may be determined to be a weight value or a multiple of a weight value. In other words, a weight value is determined per a sensing service. The weight value $W_i$ may be a predetermined or a preconfigured value, or it may be calculated. The weight value may depend on soft prioritization logics that may be preconfigured. The metric value per a sensing service may then be determined as the equal of the determined weight value $M_i(\tau)=W_i$ or a multiple of the determined weight value such as $M_i(\tau)=W_i N_i(\tau)$.

In another implementation, a current service efficiency value could be mapped into sensing metric values. The service efficiency value $E_i(\tau)$ could be a function of a channel, a scenario situation, or some other feature. For example, if time or frequency information of interference for services is available, this information may be incorporated into the service efficiency value $E_i(\tau)$ that can be a function of a resulting expected signal-to-interference-plus-noise ratio (SINR). The sensing metric value $M_i(\tau)$ may then be calculated, for example, by multiplying the calculated instantaneous relevance value by the calculated normalization value, by the determined weight value, and by the service efficiency value, and dividing the result by an average opportunistic sensing metric normalization value, and by an average previously allocated efficiency value $\epsilon_i(\tau)$. The calculating of the sensing metric value may be expressed as $$M_i(\tau) = \frac{W_i N_i(\tau) E_i(\tau)}{\epsilon_i(\tau)} \cdot \frac{G_c(\tau)}{G_s(\tau)},$$

where $\epsilon_i(\tau)=\alpha_i \epsilon_i(\tau-1)+(1-\alpha_i)E_i(\tau)R_i'(\tau)$, with $\alpha_i \in (0,1)$ a configurable parameter. The average opportunistic sensing metric normalization value $G_s(\tau)$ may be calculated in a manner similar to the average proportional fair opportunistic gain, i.e., $G_s(\tau)=\beta G_s(\tau-1)+(1-\beta)G_s'(\tau-1)$, with $\beta \in (0,1)$ a configurable parameter, and $$G_s'(\tau) = \sum_{j \in S(\tau)} \frac{M_{i(j)}(\tau)}{W_{i(j)}} R_{i(j)}(\tau),$$

where $S(\tau)$ is a set of resources allocated to sensing services at time $\tau$, that is, the resources that would be scheduled to sensing services at time $\tau$. The previously presented formulation of sensing metric values would be obtained by setting $E_i(\tau)=1$. Note that the normalization value $G_c(\tau)$ and the average opportunistic sensing metric normalization value $G_s(\tau)$ are updated if there is at least one active communication service or one active sensing service, respectively. Moreover, the values are updated if there is a real competition for resources and not all offered traffic is getting through. If either $G_c(\tau)$ or $G_s(\tau)$ is not updated for N consecutive slots, a different smoothing factor $\alpha(N)=\alpha^N$ or $\beta(N)=\beta^N$ is used, respectively.

When metric values for communication services and sensing services to which resources are to be allocated have been determined in a manner explained above, the communication services and the sensing services are then sorted in block 203 based on the determined metric values using a third rule. The third rule may be a descending order of magnitude if the metric values are determined in such a way that a service associated with a larger metric value is prioritized over a service having a smaller metric value. In another example the third rule could be an ascending order of magnitude. In another example services may be allocated an amount resources proportional to the determined metric values. Resources are allocated in block 204 for the communication services and the sensing services based on the sorted order. In another example services may be sorted and allocated resources one by one, or part by part. For example, a service that has a highest metric value is searched for and resources are allocated to that service. Then, if there are more resources to be allocated, a service that has a second highest metric value is searched for and resources are allocated to that service. This is continued until there are no resources to be allocated.

Figure 3:
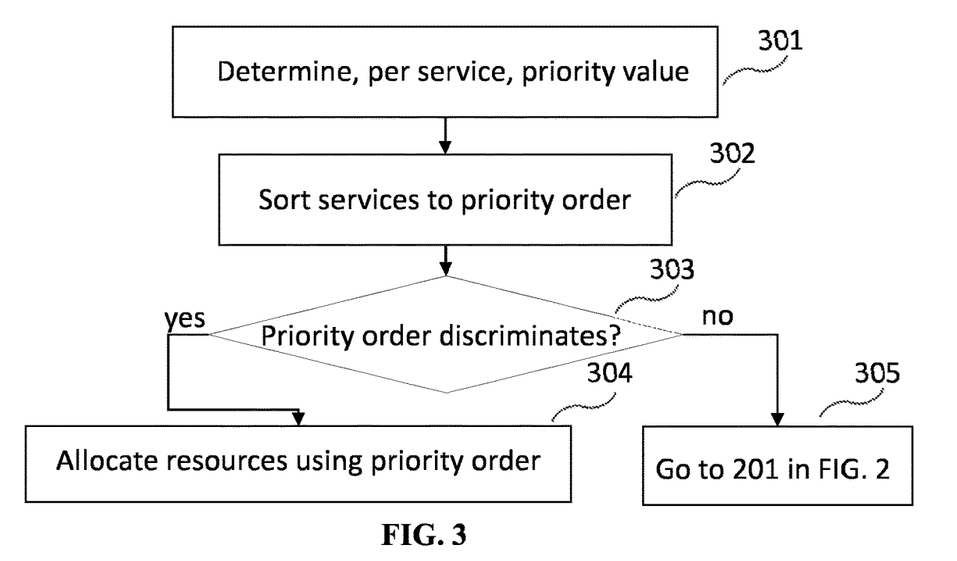

FIG. 3 illustrates another example functionality of an apparatus configured to flexible allocation of resources from a common shared resource pool using hard prioritization as a primary and soft prioritization as a secondary resource allocation tool.

Referring to FIG. 3, a priority value is determined in block 301 for the communication and sensing services, per a service. The services are then sorted in block 302 to a priority order based on the priority values, prior to determining the metric values and sorting based on the metric values. It is then resolved in block 303, whether the services are discriminated by the priority order to perform allocating resources. If the services are discriminated by the priority order to perform allocating resources (block 303: yes), resources are allocated in block 304 to the services using the priority order. If the services are not discriminated by the priority order to perform allocating resources (block 303: no), the process continues in block 305 to block 201 in FIG. 2 to perform determining the metric values, sorting the services based on the metric values, and allocating resources to the services using the sorted order based on the metric values. This may be performed for a subset of the services, if the priority order discriminates the services partly such that, for example, a subset of the services has a higher priority value than the rest of the services, but there are not enough resources to be allocated to the subset as a whole. This is described in more detail with FIG. 6.

Figure 4:
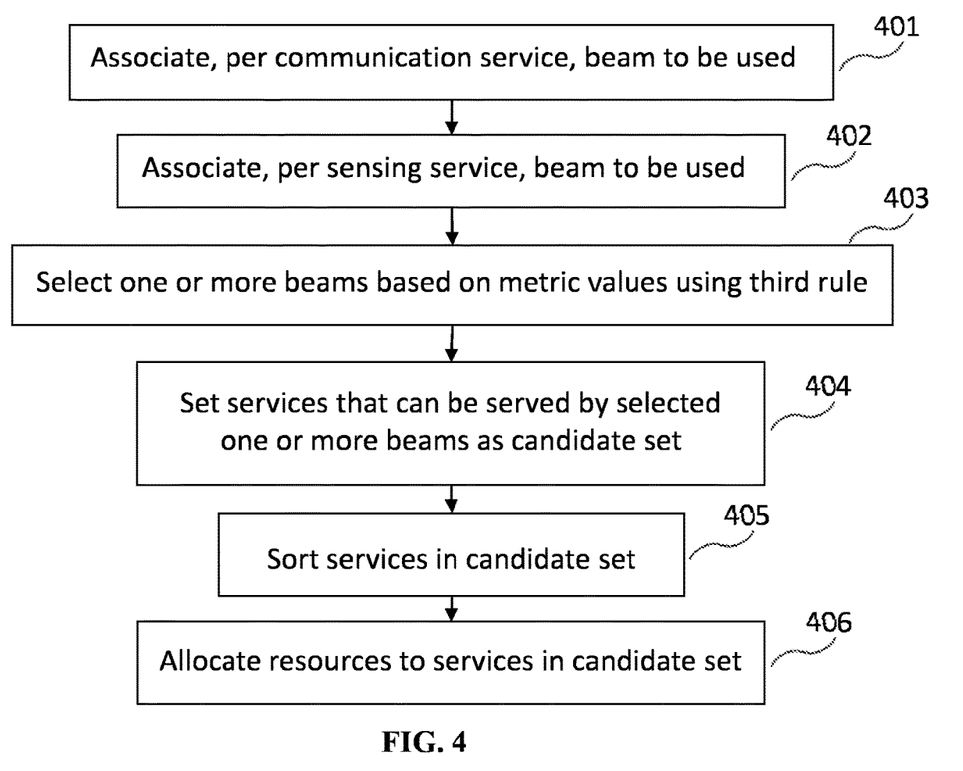

FIG. 4 illustrates another example functionality of an apparatus configured to flexible allocation of resources from a common shared resource pool with beam selection.

Referring to FIG. 4, an optimal beam to be used by a communication service is associated in block 401, per a communication service. The optimal beam may be understood as a beam that is estimated to be the best beam for the service based on, for example, measured quality of received signals. An optimal beam to be used by a sensing service is associated in block 402, per a sensing service. One or more beams associated to a communication service or a sensing service are selected in block 403 based on the metric values using the third rule. Here it is assumed that metric values have been determined for the communication services and the sensing services prior to the selection in block 403. The third rule may be a descending order of magnitude if the metric values are determined in such a way that a service associated with a larger metric value is prioritized over a service having a smaller metric value. Communication services and sensing services that can be served by the one or more beams selected are set in block 404 as a candidate set. Note that the communication services and sensing services may be selected to the candidate set even if the one or more selected beams do not comprise their associated optimal beam(s). This is due to that in addition to optimal beams, services may be served also by other, sub-optimal beams. The communication services and the sensing services in the candidate set are sorted in block 405 to a sorted order. The sorting may be based on the metric values. Alternatively, the sorting may include determining, per a service in the candidate set, a weight value and sorting based on the weight values. Resources are then allocated in block 406 to the services in the candidate set based on the sorted order. A metric-value-based competition amongst communication services and sensing services may enable implementing an apparatus with minimal impact on current deployed solutions.

Figure 5:
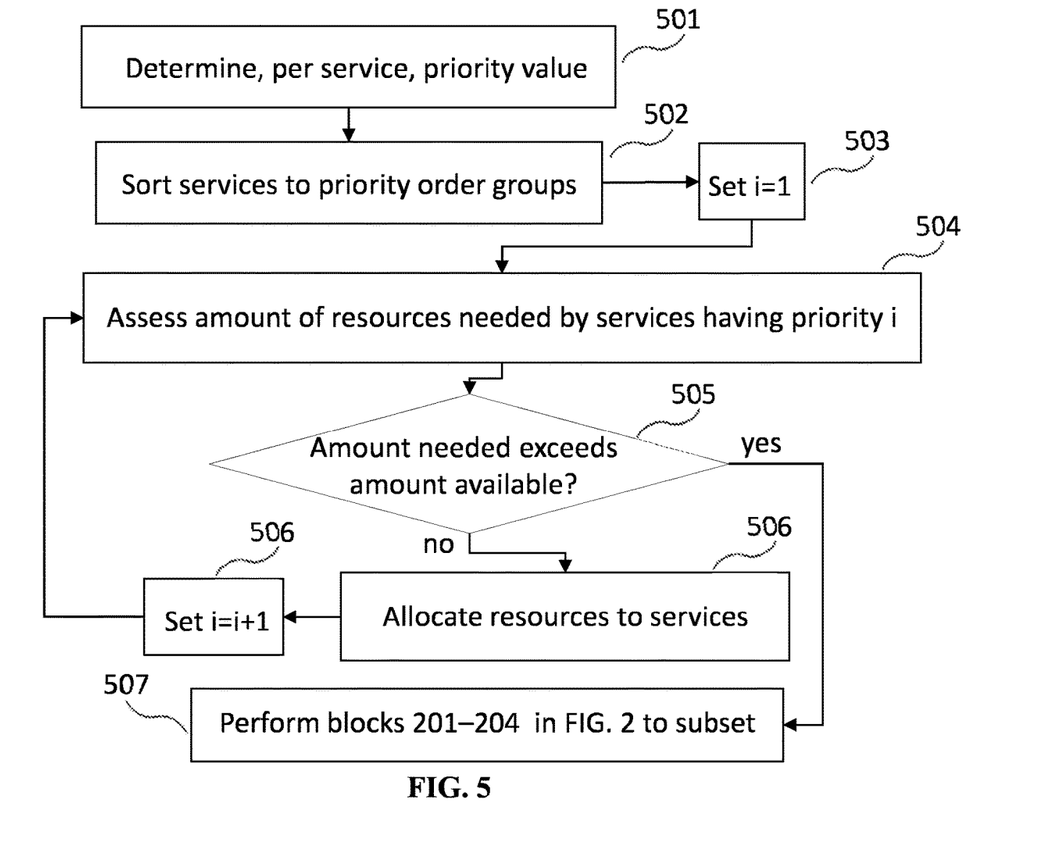

FIG. 5 illustrates another example functionality of an apparatus configured to flexible allocation of resources from a common shared resource pool using hard prioritization as a primary and soft prioritization as a secondary resource allocation tool for groups of services determined by hard prioritization.

Referring to FIG. 5, a priority value is determined in block 501 for the communication and sensing services, per a service. The services are then sorted in block 502 to priority order groups based on the priority values. In the illustrated example, the priority groups are numbered with integers 1, 2, 3 etc. wherein a smaller number means a higher priority. The index i for priority group number is set in block 503 to 1. An amount of resources needed by the services in the priority group i is assessed in block 504. It is then resolved in block 505 whether the assessed amount needed by the services having priority i exceeds an amount of available resources. If the assessed amount does not exceed the amount of available resources (block 505: no), resources are allocated in block 506 to the services. Then the index i for priority group number is increased in block 506 by 1 and the process continues to block 504. If the assessed amount exceeds the amount of available resources, blocks 201-204 in FIG. 2 are performed to the subset of services having priority i. In another example the blocks 201-204 in FIG. 2 are performed to the subset of services having priority value equal to or greater than i.

Figure 6:
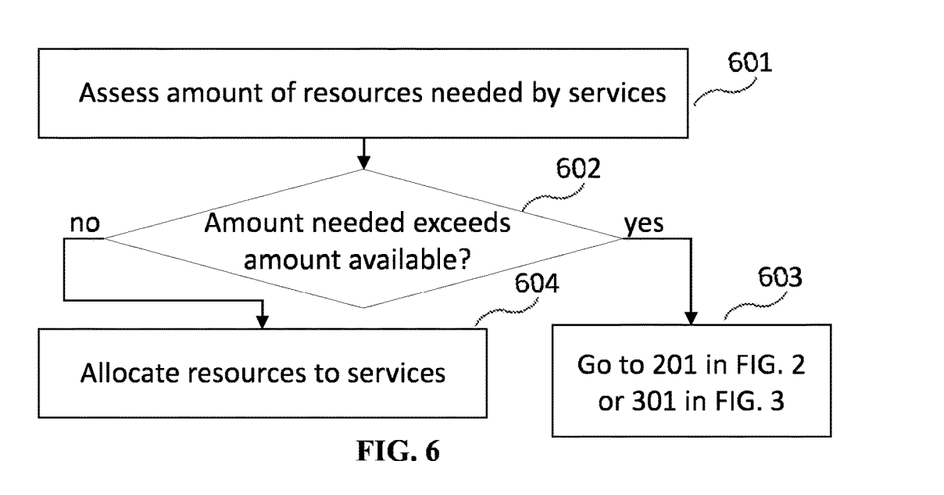

FIG. 6 illustrates another example functionality of an apparatus configured to flexible allocation of resources from a common shared resource pool resolving a need for a metric-based resource allocation.

Referring to FIG. 6, an amount of resources needed by the services is assessed in block 601. It is then resolved in block 602 whether the assessed amount needed by the services exceeds an amount of available resources. If the assessed amount exceeds the amount of available resources (block 602: yes), the process continues, depending on implementation, in block 603 to block 201 in FIG. 2 to perform determining the metric values, sorting the services based on the metric values and allocating resources to the services using the sorted order based on the metric values, or to block 301 in FIG. 3 to first perform determining the priority values and sorting the services to the priority order. If the assessed amount does not exceed the amount of available resources (block 602: no), resources are allocated in block 604 to the services.

As can be seen from the examples above, solutions enabling joint scheduling and resource allocation of communication services and sensing services may set sensing services and communication services to equal ranks in resource allocation, and they may help avoiding bottlenecks in a limited pool of resources.

The blocks, and related functions described above by means of FIG. 2 to 6 are in no absolute chronological order, and some of them may be performed simultaneously or in an order differing from the given one. Other functions can also be executed between them or within them, and/or other rules applied or selected. Some of the blocks or part of the blocks or one or more pieces of information can also be left out or replaced by a corresponding block or part of the block or one or more pieces of information.

Figure 7:
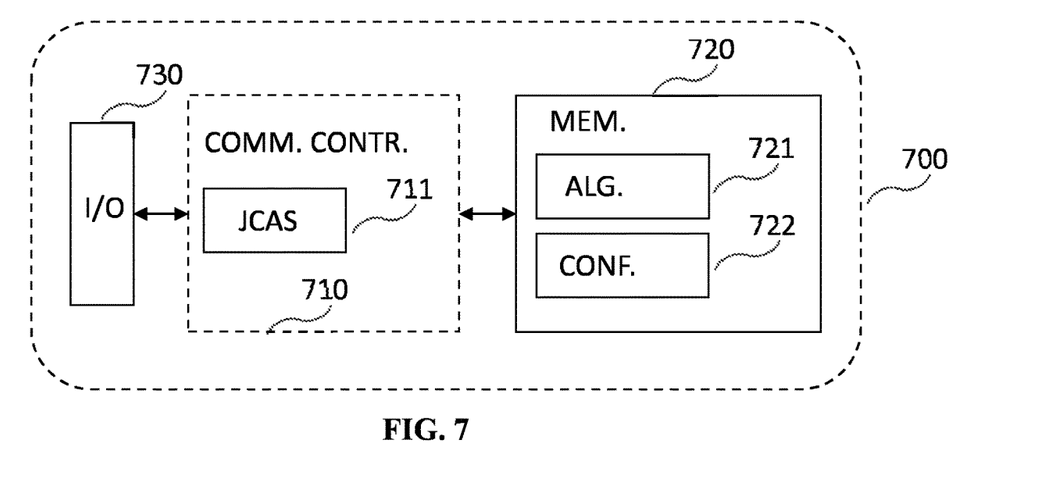
FIG. 7 is a schematic block diagram.

FIG. 7 illustrates an apparatus comprising a communication controller 710 such as at least one processor or processing circuitry, and at least one memory 720 including a computer program code (software, algorithm) ALG. 721, wherein the at least one memory and the computer program code (software, algorithm) are configured, with the at least one processor, to cause the respective apparatus to carry out any one of the embodiments, examples and implementations described above. The apparatus of FIG. 7 may be an electronic device, for example a transmitter for a user device, an access node/base station/gNB, a scheduler, or a scheduling apparatus.

Referring to FIG. 7, the memory MEM. 720 may be implemented using any suitable data storage technology, such as semiconductor based memory devices, flash memory, magnetic memory devices and systems, optical memory devices and systems, fixed memory, and removable memory. The memory may comprise a configuration storage CONF. 722, such as a configuration database, for at least storing one or more configurations and/or corresponding parameters/parameter values, for example the criteria to use for decision(s), or the counter value, or number of sensed consecutive idle slots. The memory 720 may further store a data buffer for uplink data waiting for transmission and/or downlink data waiting to be decoded. The memory 720 may further store a data buffer for scheduling data for determining scheduling prioritization order, for example, priority values, weight values, average opportunistic proportional gain values, average allocated resources values, and/or instantaneous relevance values.

Referring to FIG. 7, the apparatus 700 may further comprise a communication interface 730 comprising hardware and/or software for realizing communication connectivity according to one or more radio communication protocols. The communication interface 730 may provide the apparatus with radio communication capabilities with one or more base stations (access nodes) of a wireless network. The communication interface may comprise standard well-known components such as an amplifier, filter, frequency-converter, (de)modulator, and encoder/decoder circuitries and one or more antennas. Digital signal processing regarding transmission and/or reception of signals may be performed in a communication controller 710. In an embodiment, the communication interface may comprise one or more antenna arrays providing the apparatus with capability of forming directive transmission radio beams and the reception radio beams.

The communication controller 710 may comprise one or more joint communication and sensing (JCAS) schedulers 711 configured to perform the resource allocation according to any one of the embodiments/examples/implementations described above. Communication controller 710 may control information exchange relating to communication services and sensing services.

The apparatus 700 may further comprise an application processor (not illustrated in FIG. 7) executing one or more computer program applications that generate a need to transmit and/or receive data. The application processor may execute computer programs forming the primary function of the apparatus. For example, if the apparatus is a sensor device, the application processor may execute one or more signal processing applications processing measurement data acquired from one or more sensor heads. If the apparatus is a computer system of a vehicle, the application processor may execute a media application and/or an autonomous driving and navigation application.

As used in this application, the term 'circuitry' refers to all of the following: (a) hardware-only circuit implementations, such as implementations in only analog and/or digital circuitry, and (b) combinations of circuits and soft-ware (and/or firmware), such as (as applicable): (τ) a combination of processor(s) or (ii) portions of processor(s)/software including digital signal processor(s), software, and memory(ies) that work together to cause an apparatus to perform various functions, and (τ) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile device or a similar integrated circuit in a sensor, a cellular network device, or another network device.

In an embodiment, at least some of the processes described in connection with FIG. 2 to 6 may be carried out by an apparatus comprising corresponding means for carrying out at least some of the described processes. The apparatus may comprise separate means for separate phases of a process, or means may perform several phases or the whole process. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry. In an embodiment, the at least one processor, the memory, and the computer program code form processing means or comprises one or more computer program code portions for carrying out one or more operations according to any one of the embodiments/examples/implementations described herein.

According to yet another embodiment, the apparatus carrying out any of the embodiments comprises a circuitry including at least one processor and at least one memory including computer program code. When activated, the circuitry causes the apparatus to perform at least some of the functionalities according to any one of the embodiments/examples/implementations of FIG. 2 to 6, or operations thereof.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chip set (e.g., procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems (apparatuses) described herein may be rearranged and/or complemented by additional components in order to facilitate the achievements of the various aspects, etc., described with regard thereto, and they are not limited to the precise configurations set forth in the given Figures, as will be appreciated by one skilled in the art.

Embodiments/examples/implementations as described may also be carried out in the form of a computer process defined by a computer program or portions thereof. Embodiments of the methods described in connection with FIG. 2 to 6 may be carried out by executing at least one portion of a computer program comprising corresponding instructions. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium, for example. Coding of software for carrying out the embodiments as shown and described is well within the scope of a person of ordinary skill in the art. In an embodiment, a computer-readable medium comprises said computer program. For example, the non-transitory medium may be a non-transitory computer readable medium comprising program instructions for causing an apparatus to perform at least the following: determining, per a communication service to which resources are to be allocated, a metric value using a first predefined set of rules, determining, per a sensing service to which resources are to be allocated, a metric value using a second predefined set of rules, sorting communication services to which resources are to be allocated and sensing services to which resources are to be allocated based on the metric values to a sorted order using a third rule, and allocating resources for the communication services and the sensing services based on the sorted order.

Even though the invention has been described above with reference to examples according to the accompanying drawings, it is clear that the invention is not restricted thereto but can be modified in several ways within the scope of the appended claims. Therefore, all words and expressions should be interpreted broadly, and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. An apparatus comprising:
at least one processor; and
at least one memory including computer program code;
the at least one memory and the computer program code being configured to, with the at least one processor, cause the apparatus at least to perform:
determining, per a communication service to which resources are to be allocated, a metric value using a first predefined set of rules;
determining, per a sensing service to which resources are to be allocated, a weight value;
calculating, per a sensing service to which resources are to be allocated, an instantaneous relevance value;
calculating, per a sensing service to which resources are to be allocated, an average allocated resources value;
calculating a normalization value to the sensing services;
determining, per a sensing service to which resources are to be allocated, a metric value by multiplying the instantaneous relevance value calculated for the sensing service by the normalization value calculated and by the weight value determined for the sensing service and dividing the result by the average allocated resources value calculated for the sensing service;
sorting communication services to which resources are to be allocated and sensing services to which resources are to be allocated based on the metric values to a sorted order using a third rule; and
allocating resources for the communication services and the sensing services based on the sorted order.

2. The apparatus according to claim 1, wherein the at least one memory and the computer program code are configured to, with the at least one processor, cause the apparatus further to perform calculating the instantaneous relevance value by:
increasing the instantaneous relevance value for the sensing service when a time elapsed from a preceding time the sensing service was allocated resources increases.

3. The apparatus according to claim 1, wherein the at least one memory and the computer program code are configured to, with the at least one processor, cause the apparatus further to perform calculating the average allocated resources value, per a sensing service, by:
- calculating an instantaneous allocated resources value; and
- calculating the average allocated resources value as a linear combination of the previous average allocated resources value calculated for the service and the instantaneous allocated resources value calculated.

4. The apparatus according to claim 1, wherein the at least one memory and the computer program code are configured to, with the at least one processor, cause the apparatus further to perform:
- determining, per a communication service, a weight value;
- calculating, per a communication service, an achievable instantaneous rate; and
- calculating, per a communication service, an average previously experienced rate;
- wherein the first predefined set of rules comprises:
  - calculating the metric value by multiplying the achievable instantaneous rate calculated for the communication service by the weight value determined for the communication service and dividing the result by the average previously experienced rate calculated for the communication service; and
  - calculating, per a communication service that was allocated resources at a preceding time resources were allocated, the average allocated resources value; and
  - calculating an instantaneous proportional fair opportunistic gain by multiplying, per a communication service that was allocated resources at the preceding time resources were allocated, the metric value calculated for the communication service by the average allocated resources value calculated for the communication service, dividing, per a communication service, the result by the weight value determined for the communication service, adding the results per communication services together for resources allocated to the communication services that were allocated resources at the preceding time resources were allocated, and dividing the sum by the number of the said resources allocated.

5. The apparatus according to claim 4, wherein the at least one memory and the computer program code are configured to, with the at least one processor, cause the apparatus further to perform calculating the normalization value by:
- calculating the instantaneous proportional fair opportunistic gain of communication services that were allocated resources at the preceding time resources were allocated;
- calculating an average proportional fair opportunistic gain as a linear combination of the calculated instantaneous proportional fair opportunistic gain and the average proportional fair opportunistic gain at the preceding time resources were allocated; and
- determining the normalization value as the calculated average proportional fair opportunistic gain.

6. The apparatus according to claim 1, wherein the at least one memory and the computer program code are configured to, with the at least one processor, cause the apparatus further to perform:
- determining, prior to determining the metric values and sorting based on the metric values, for the services, per a service, a priority value;
- sorting, prior to determining the metric values and sorting based on the metric values, the services to a priority order based on the priority values;
- if the services are discriminated by the priority order to perform allocating resources, allocating resources to the services using the priority order;
- otherwise, performing determining the metric values and sorting the services based on the metric values and allocating resources to the services using the sorted order based on the metric values.

7. The apparatus according to claim 1, wherein the at least one memory and the computer program code are configured to, with the at least one processor, cause the apparatus further to perform, when resources to be allocated are provided on a plurality of beams:
- associating, per a communication service, a beam to be used by the communication service;
- associating, per a sensing service, a beam to be used by the sensing service;
- selecting at least one beam associated to a communication service or a sensing service based on the metric values using the third rule;
- setting communication services and sensing services that can be served by the at least one beam selected as a candidate set;
- sorting the communication services and the sensing services in the candidate set to a sorted order either based on the metric values, or determining, per a service in the candidate set, a weight value and sorting based on weight values; and
- allocating resources to the services in the candidate set based on the sorted order.

8. The apparatus according to claim 1, wherein the at least one memory and the computer program code are configured to, with the at least one processor, cause the apparatus further to perform:
- assessing an amount of resources needed by the services;
- if the assessed amount of resources needed exceeds an amount of available resources, performing determining the metric values, sorting the services based on the metric values, and allocating resources to the services using the sorted order;
- otherwise, allocating resources to the services.

9. A method comprising:
- determining, per a communication service to which resources are to be allocated, a metric value using a first predefined set of rules;
- determining, per a sensing service to which resources are to be allocated, a weight value;
- calculating, per a sensing service to which resources are to be allocated, an instantaneous relevance value;
- calculating, per a sensing service to which resources are to be allocated, an average allocated resources value;
- calculating a normalization value to the sensing services;
- determining, per a sensing service to which resources are to be allocated, a metric value by multiplying the instantaneous relevance value calculated for the sensing service by the normalization value calculated and by the weight value determined for the sensing service and dividing the result by the average allocated resources value calculated for the sensing service;
- sorting communication services to which resources are to be allocated and sensing services to which resources are to be allocated based on the metric values to a sorted order using a third rule; and
- allocating resources for the communication services and the sensing services based on the sorted order.

10. A non-transitory computer-readable medium comprising program instructions encoded thereon which, when executed on an apparatus, cause the apparatus to perform at least:
- determining, per a communication service to which resources are to be allocated, a metric value using a first predefined set of rules;
- determining, per a sensing service to which resources are to be allocated, a weight value;
- calculating, per a sensing service to which resources are to be allocated, an instantaneous relevance value;
- calculating, per a sensing service to which resources are to be allocated, an average allocated resources value;
- calculating a normalization value to the sensing services;
- determining, per a sensing service to which resources are to be allocated, a metric value by multiplying the instantaneous relevance value calculated for the sensing service by the normalization value calculated and by the weight value determined for the sensing service and dividing the result by the average allocated resources value calculated for the sensing service;
- sorting communication services to which resources are to be allocated and sensing services to which resources are to be allocated based on the metric values to a sorted order using a third rule; and
- allocating resources for the communication services and the sensing services based on the sorted order.

* * * * *